Patented Oct. 29, 1935

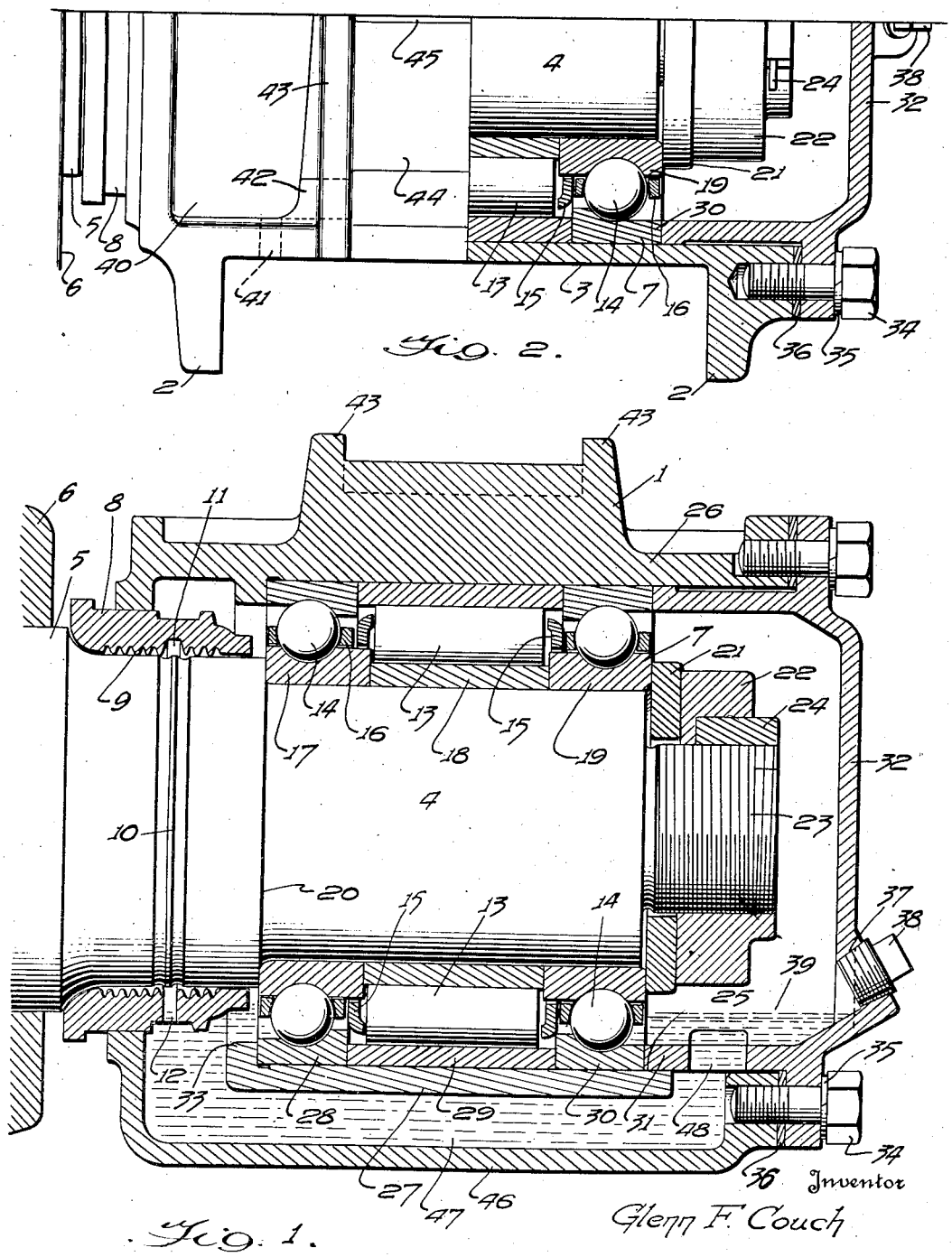

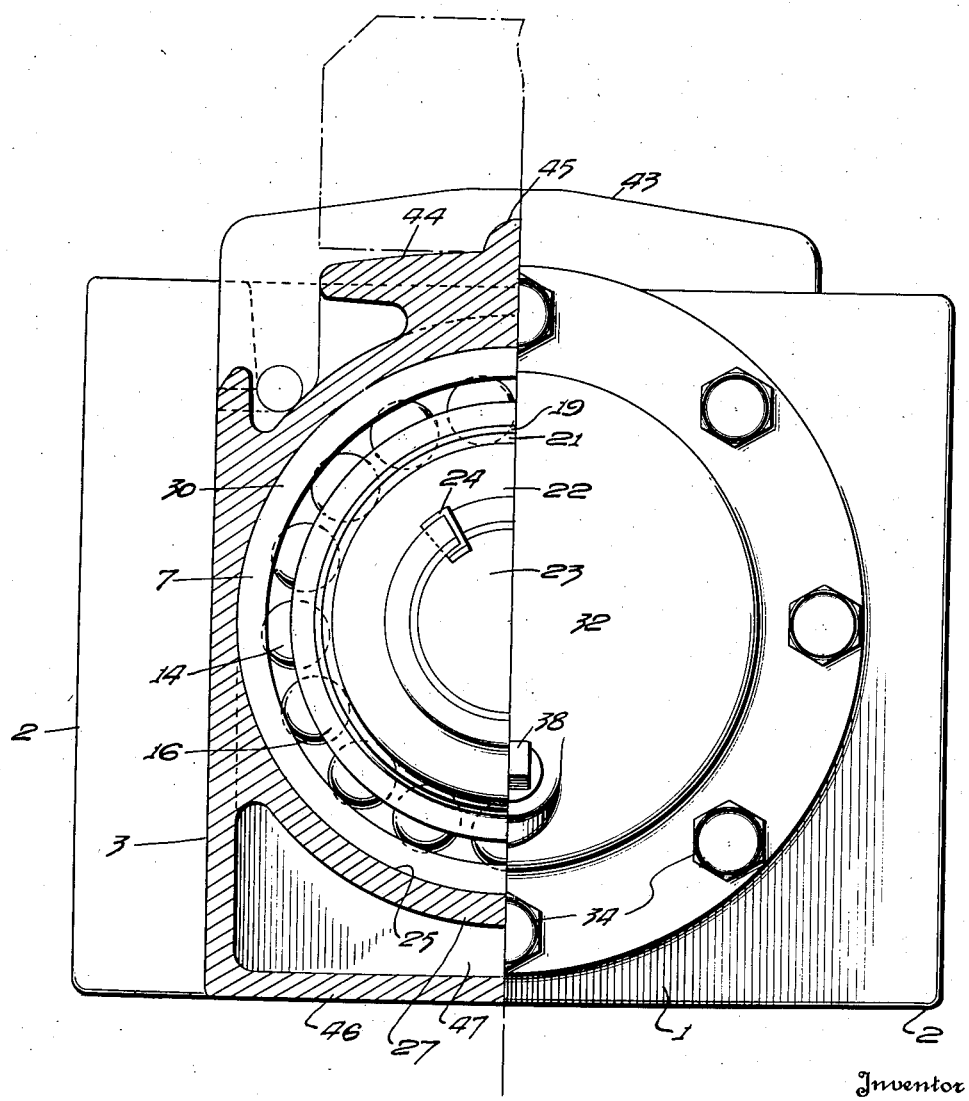

2,018,949

UNITED STATES PATENT OFFICE

2,018,949

JOURNAL BOX

Glenn F. Couch, Rochester, N. Y., assignor to The Symington Company, New York, N. Y., a corporation of Maryland Application April 1, 1930, Serial No. 440,811

9 Claims. (Cl. 308—180)

This invention relates to journal boxes, and more particularly to such provided with anti-friction bearings disposed between said boxes and associated journals.

The principal object of my invention, generally considered, is to provide an anti-friction bearing assembly involving both rollers and balls, and so arranged and of such relative sizes that the position of the balls with respect to the rollers varies as the journal rotates so that a different series of rollers and balls is under pressure at every cycle of revolution, whereby the service life of the bearing is increased.

Another object of my invention is to provide an anti-friction bearing involving a series of rollers with a series of balls on either side thereof, said rollers being adapted to take the main pressure between the journal and box, and balls being adapted to take care of end thrusts and supplement the rollers for taking some of the pressure.

A further object of my invention is to provide a journal box, the roof of which has pockets to receive oil waste and is provided with oil ports extending from said pockets for lubricating the pedestal ways.

A still further object of my invention is the provision of a journal box in which the roof is formed to provide an interlocking equalizer seat and the cover portion thereof is adapted to hold the outer bearing races in place with respect to the parts.

Other objects and advantages of the invention relating to the particular arrangement and construction of the various parts will become apparent as the description proceeds.

Referring to the drawings illustrating my invention, the scope whereof is defined by the appended claims:—

Figure 1 is a transverse sectional view of a journal box and anti-friction bearing assembly, the associated journal being shown in side elevation.

Fig. 2 is a partial plan and partial horizontal, sectional view of the journal box and parts contained therein shown in Fig. 1.

Fig. 3 is a partial end elevation and partial transverse sectional view of the journal and parts therein shown in the preceding figures.

Referring to the drawings in detail, like parts being designated by like reference characters, there is shown a journal box 1 which, in the present embodiment, has outstanding flanges 2 providing channels 3 on either side thereof adapted to engage the legs or depending portions of a truck pedestal (not shown), thereby providing the usual pedestal ways. Received in the journal box 1 is a journal 4 extending from an axle 5 on which may be mounted wheels 6, only a fragmentary portion of one of which is shown. Although only one end of the axle 5 is illustrated, it will be understood that the other end may be of a similar construction and associated with a similar journal box.

Disposed between the journal 4 and the box 1 is an anti-friction bearing assembly 7. For closing the annular space between the journal 4 and box 1, a bushing 8 may be provided as shown, the inner surface of which is desirably ribbed or corrugated, as indicated at 9, to minimize the loss of oil thereby. That portion of the journal adjacent the corrugations 9 is desirably formed with a rib 10 between grooves thereon and acting as oil-throwing means for discharging oil which might tend to flow between the bushing 8 and journal 4 into the channel 11 in said bushing, from whence it is adapted to drain back into the box through the aperture 12.

The anti-friction bearing assembly preferably comprises roller bearings 13 and ball bearings 14, the series of roller bearings 13 and cage 15 having desirably on both sides the ball bearings 14 and associated cages 16. The inner races or bearing bushings for the balls and rollers desirably abut one another, as illustrated, and all of said bushings designated 17, 18 and 19 are desirably held in place against the shoulder 20 on the journal by means of a washer 21 and nut 22 threadably engaging the reduced end portion or extension 23 of the journal 4, and pressing on the end portion of the bushing 19 which extends beyond the journal 4 over said extension 23. Locking means 24 of any desired character, for example, such as described and claimed in my co-pending application, Serial No. 406,424, filed November 11, 1929, may be used to prevent undesired loosening of the nut.

The interior of the journal box 1 is formed with a cylindrical cavity 25 between the top wall 26 and an intermediate curved wall 27 and in said cavity is desirably secured the outer races or bushings 28, 29, and 30 for the inner ball bearing, the roller bearing, and the outer ball bearing, respectively, said races being all desirably held in place by the inwardly extending annular flange 31 on the cover or lid 32 which urges said bushings into tight engagement with the shouldered portion 33 on the box. The lid 32 is desirably secured in place by a plurality of tap bolts 34 with locking washers 35, a gasket 36 being desirably interposed between the lid and the outer edge of the journal box to render the same oil-tight. The lid is desirably provided with a filling aperture 37 closed by a threaded plug 38, the level of the oil 39 in the box being desirably sustained substantially as indicated, that is, at approximately the bottom of the filling aperture 37.

In order to provide for properly lubricating the pedestal ways 3, the roof of the box desirably has pockets 40 disposed adjacent the front and rear portions thereof, which pockets are adapted to receive oil waste, ports 41 being provided to permit the seepage of oil to the pedestal ways, and ports 42 being desirably provided to equalize the oil between the front and rear pockets. That portion of the roof box between the pockets is desirably provided with upstanding flanges 43 providing a seat 44 therebetween for an associated equalizer, said seat being desirably formed with an upstanding rib or flange 45 transverse to the flanges 43 to provide for interlocking with respect to said equalizer. The lower portion of the box 1 between the intermediate web 27 and the bottom wall 46 provides a reservoir adapted to contain oil or other lubricating means, said pocket 47 thus provided extending from front to rear of the box for equalizing the oil level, the annular flange 31 on the lid being desirably apertured, as indicated at 48, to avoid closing the front portion of the oil reservoir 47.

From the foregoing disclosure, it will be seen that I have devised an improved anti-friction journal box particularly adapted for use on railway rolling stock and providing not only for taking vertical loads, but also for end thrust between the journal and box. The box is designed to provide an adequate oil reservoir, the oil being positioned at such a low level that it will normally not be lost out of the box while the vehicle is standing still, and when in motion, provision is made for preventing loss of oil by an oil-throwing rib on the journal. Although the rollers and balls may desirably be positioned on the same pitch diameter, the diameter of the balls is preferably slightly greater than that of the rollers, or vice versa, so that as the journal rotates, the rollers and balls travel around the races or bushings at different rates of speed, whereby a different series of rollers and balls is under pressure at every cycle of revolution. In this way, the service life of the bearing is increased, as will be understood by those skilled in the art.

Although I have disclosed a preferred embodiment of my invention, it will be understood that the same is merely illustrative and not limiting, and modifications may be made within the scope of the appended claims.

I claim:—

1. In combination, a journal box comprising a web disposed intermediate the upper and lower walls thereof, and defining a lubricant reservoir above said lower wall, a journal therein, ball bearing races separated by a roller bearing cylindrical bushing mounted inside of said box between said web and upper wall, cylindrical roller bearing means disposed radially inward of and engaging said bushing, and ball bearing means disposed radially inward of and engaging said races, said roller and ball bearing means serving to separate said journal and box and provide for anti-friction movement of said journal, said cylindrical roller bearing means being adapted to take part of the main load, and said ball bearing means being adapted to take care of end thrust and the remainder of the main load, the ratios between the diameters of the anti-friction means and the corresponding pitch diameters differing for the cylindrical rollers and balls, whereby said rollers and balls have different circumferential speeds.

2. In combination, a journal box comprising a web disposed intermediate the upper and lower walls thereof, and defining a lubricant reservoir above said lower wall, a journal therein, a pair of ball bearing races separated by a roller bearing cylindrical bushing mounted on said journal, cylindrical roller bearing means disposed between said journal and said web and upper wall of said box and engaging said bushing, and ball bearing means disposed radially outward of and engaging said races and disposed between said journal and said web and upper wall of the box, said cylindrical roller bearing means being adapted to take the greater part of the main load, and said ball bearing means being adapted to take care of end thrust and the remainder of the main load, the ratios between the roller and ball diameters and the corresponding pitch diameters differing, whereby said rollers and balls have different circumferential speeds.

3. In combination, a journal box comprising a web disposed intermediate the upper and lower walls thereof, and defining a lubricant reservoir above said lower wall, a journal therein, a cover for said box, ball bearing races separated by a roller bearing cylindrical bushing mounted inside of said box between said web and upper wall, said cover engaging the adjacent race for pressing it and the associated bushing and race against the box, a pair of ball bearing races separated by a roller bearing cylindrical bushing mounted on said journal, a nut on said journal for holding said races and bushing in place, said journal bushing being disposed radially of said box bushing, and said journal races being respectively disposed radially of said box races, cylindrical rollers mounted between said bushings and balls mounted between said races, said cylindrical roller bearing means being adapted to take the main load, and said ball bearing means being adapted to take care of end thrust, the ratios between the roller and ball diameters and the corresponding pitch diameters differing, whereby said rollers and balls have different circumferential speeds.

4. In combination, a journal box comprising a web disposed intermediate the upper and lower walls thereof, and defining a lubricant reservoir above said lower wall, a journal therein, a cover adapted to close the outer opening in said box, ball-bearing raceways separated by roller bearing bushings mounted inside of said box between said web and upper wall, said cover having an inwardly extending annular flange engaging the outer ball-bearing raceway for pressing it and the associated bushing and raceway against a shouldered portion of the box, cylindrical roller bearing means engaging said bushing, and ball-bearing means engaging said raceways and disposed between said journal and box, said cylindrical bearing means being adapted to take the main load and the roller bearing means being adapted to take care of end thrust.

5. In combination, a journal box comprising a web disposed intermediate the upper and lower walls thereof, and defining a lubricant reservoir above said lower wall, a journal rotatably mounted therein, a pair of ball-bearing raceways separated by a roller bearing bushing mounted on said journal and engaging a shoulder thereon, a nut threadably engaging an end portion of said journal for holding said raceways and bushing in place, cylindrical roller bearing means disposed between said journal and said web and upper wall of the box and engaging said bushing, and ball-bearing means disposed between said journal and said web and upper wall of the box and engaging said raceways.

6. In combination, a journal box comprising a web disposed intermediate the upper and lower walls thereof, and defining a lubricant reservoir above said lower wall, a journal therein, a cover adapted to close the outer opening of said box, ball-bearing raceways separated by a roller bearing cylindrical bushing mounted inside of said box between said web and upper wall, said cover having a flange portion normally engaging the outer ball-bearing raceway for pressing it and the associated bushing and raceway against a shouldered portion on said web and upper wall of the box, cylindrical roller bearing means disposed radially inward of and engaging said bushing, and ball-bearing means disposed radially inward of and engaging said ball-bearing raceways, said roller bearing means serving to separate said journal and box and provide for anti-friction movement of said journal, said cylindrical roller bearing means being adapted to take part of the main load and said ball-bearing means being adapted to take care of the end thrust and the remainder of the main load, the ratios between the roller and ball diameters and the corresponding pitch diameters differing for the cylindrical rollers and the balls whereby said anti-friction means have different circumferential speeds.

7. In combination, a journal box comprising a web disposed intermediate the upper and lower walls thereof, and defining a lubricant reservoir above said lower wall, a journal therein, a pair of ball-bearing raceways separated by a roller bearing cylindrical bushing mounted on said journal and engaging a shouldered portion thereof, a nut threadably engaging an end portion of said journal for holding said raceways and bushings in place, cylindrical roller bearing means disposed between said journal and said web and upper wall of the box and engaging said bushing, and ball-bearing means disposed radially outward of and engaging said raceway, and disposed between said journal and said web and upper wall of the box, said cylindrical roller bearing means being adapted to take the greater part of the main load, and said ball-bearing means being adapted to take care of end thrust and the remainder of the main load, the ratios between the cylindrical roller and ball diameters and the corresponding pitch diameters differing for the anti-friction means, whereby said rollers and balls have different circumferential speeds.

8. In combination, a journal box comprising a web disposed intermediate the upper and lower walls thereof, and defining a lubricant reservoir above said lower wall, a journal therein, a cover for said box, a pair of ball-bearing raceways separated by a roller bearing cylindrical bushing mounted inside of said box between said web and outer wall, said cover engaging the adjacent raceway for pressing it and the associated bushing and raceway against the box, a pair of ball-bearing raceways separated by a roller bearing cylindrical bushing mounted on said journal, a nut on said journal for holding said raceways and bushing in place, said journal bushing being disposed radially of said box bushing and said journal raceways being respectively disposed radially of said box raceways, and cylindrical rollers mounted between said bushings and balls mounted between said raceways, said cylindrical roller bearing means being adapted to take the main load and said ball-bearing means being adapted to take care of end thrust, the ratio of the roller diameters to the corresponding pitch diameter differing from the ratio of the ball diameters to the corresponding pitch diameter, whereby said rollers and balls have different circumferential speeds.

9. In combination, a journal box comprising a web disposed intermediate the upper and lower walls thereof, and defining a lubricant reservoir above said lower wall, a journal therein, a cover for said box, a pair of ball-bearing raceways separated by a roller bearing cylindrical bushing mounted inside of said box between said web and outer wall, said cover engaging the adjacent raceway for pressing it and the associated bushing and raceway against the box, a pair of ball-bearing raceways separated by a roller bearing cylindrical bushing mounted on said journal, a nut on said journal for holding said raceways and bushing in place, said journal bushing being disposed radially of said box bushing and said journal raceways being respectively disposed radially of said box raceways, and cylindrical rollers mounted between said bushings and balls mounted between said raceways.

GLENN F. COUCH.